United States Patent Office 3,219,623
Patented Nov. 23, 1965

3,219,623
STABILIZATION OF OXYMETHYLENE COPOLYMERS WITH AN HYDROXY CONTAINING REACTANT
Frank M. Berardinelli, South Orange, N.J., assignor to Celanese Corporation of America, New York, N.Y., a corporation of Delaware
No Drawing. Filed June 3, 1964, Ser. No. 372,390
12 Claims. (Cl. 260—45.95)

This invention relates to stabilized polymers and more particularly to polymers which are stable against degradation but derived from polymers which are susceptible to degradation. This invention is a continuation-in-part of my copending application Serial No. 102,097, filed April 11, 1961 which in turn is a continuation-in-part of application Serial No. 23,658, filed April 21, 1960, both abandoned.

For convenience the invention will be described with reference to thermally stabilized oxymethylene polymers, although, as will be disclosed below, the methods of the invention are applicable to other polymers and particularly to polymers derived largely from monomers which do not ordinarily produce stable monomers.

Oxymethylene polymers, have recurring —$CH_2O$— units directly attached to each other, have been known for many years. They may be prepared by the polymerization of anhydrous formaldehyde or by the polymerization of trioxane which is a cyclic trimer of formaldehyde. Oxymethylene polymers vary in thermal stability and in molecular weight, depending on their method of preparation. Oxymethylene homopolymers of exceptionally high molecular weight and relatively good stability have been prepared by the repeated sublimation of trioxane from a temperature of 40° C. to a temperature of —80° C. Exceptionally high molecular weight polyoxymethylene has also been prepared by polymerizing anhydrous formaldehyde in the presence of aliphatic or aromatic primary amines or in the presence of arsines, stibines or phosphines.

High molecular weight polyoxymethylenes may be prepared in high yields and at rapid reaction rates by the use of catalyst comprising boron fluoride coordinate complexes with organic compounds in which oxygen or sulfur is the donor atom, as described in U.S. Patent No. 2,986,506 by Hudgin and Berardinelli.

Oxymethylene polymers of improved thermal stability have been prepared by copolymerizing trioxane with from 0.1 to 15 mol percent of a cyclic ether having at least two adjacent carbon atoms. Copolymers of this type are described in U.S. Patent No. 3,027,352 by Cheves T. Walling, Frank Brown and Kenneth W. Bartz. Such copolymers may be described as having at least one chain containing between about 85 and about 99.9 mol percent of oxymethylene (—$OCH_2$—) units interspersed with between about 0.4 and about 15 mol percent of —O—R— units wherein R is a divalent radical containing at least two carbon atoms directly linked to each other and positioned in the chain between the two valences with any substituent in the R radical being inert. The preferred copolymers are those made up of oxymethylene and oxyethylene groups, such as copolymers of trioxane with dioxolane or with ethylene oxide.

The use of techniques which are conducive to the production of polymers of high molecular weight and by the incorporation of comonomers, as described above, it has been possible to produce polymers having oxymethylene groups directly attached to each other which are relatively stable against thermal degradation. By further incorporation of chemical stabilizers it has been possible to stabilize oxymethylene polymers so that their degradation rate at 222° C. is less than about 0.1 weight percent per minute for most of the polymer mass when the polymer is maintained in an open vessel in a circulating air oven at 222° C. However, despite this high stability for most of the polymer mass, it has been difficult to reduce the initial degradation rate of the polymer (at 222° C. in air) to a satisfactory level. It has been found that a polymer may be reduced to a degradation rate (at 222° C. in air) for most of its mass of less than 0.1 weight percent per minute while the initial 0.5 to 20 weight percent of the polymer has a higher degradation rate (at 222° C. in air) of the order of between 1 and 0.5 weight percent per minute. For the purpose of convenience the degradation rate (at 222° C. in air) for most of the polymer mass is hereinafter designated as the "base" degradation rate.

During molding processes, oxymethylene polymers are generally heated to temperatures between about 180° and about 230° C. for relatively short periods between about 5 seconds and about 5 minutes. Even where the base degradation rate (at 222° C. in air) has been reduced to below 0.1 weight percent per minute, it has been found that molded products have uneven surface characteristics, due to gassing, unless the initial degradation rate is also reduced to below 0.1 weight percent per minute.

It is a further object of this invention to provide thermal stability to copolymers containing oxymethylene units and oxyalkylene units with adjacent carbon atoms.

These and other objects are achieved by a process for the stabilization of a polymer having stable and unstable portions in its molecules which comprises treating said polymer with a reactant to selectively degrade the polymer and remove unstable portions from its molecules.

In a more specific aspect of the invention, there is provided a method of stabilizing against thermal degradation a heterogeneous polymer susceptible to such degradation and containing monomeric units or high susceptibility to thermal degradation to the monomer interspersed with monomeric units which are stable to thermal degradation which comprises subjecting said polymer to a selective chemical reactant treatment to degrade the end portions of said polymer made up of said susceptible monomeric units and to leave a residual polymer having said stable monomeric units in the terminal positions. In one embodiment of this invention, at least 95% of the polymeric chains of the treated polymer have stable or removal-resistant units in the terminal positions.

When the heterogeneous copolymer is a copolymer of oxymethylene units and the aforementioned —O—R— units, such as higher oxyalkylene units, the selective chemical treatment is a hydrolysis (which term includes alcoholysis) treatment under conditions wherein the pH is maintained at or above 7. Thus the treatment takes place under non-acidic, and preferably alkaline conditions. The oxymethylene copolymer is preferably subjected to contact with a hydrolysis medium, such as water, usually containing an alkylene agent under hydrolysis conditions until the desired selective degradation takes place. Preferably, the polymer is subjected to these conditions until it achieves a substantially constant weight.

In place of water, an organic hydroxy-containing material, such as an alcohol, may be used. Suitable alcohols include aliphatic alcohols and preferably those containing from 1 to 20 carbon atoms including methyl alcohol, ethyl alcohol, n-propyl alcohol, isopropyl alcohol, n-butyl alcohol, isobutyl alcohol, sec-butyl alcohol, tert-butyl alcohol, the amyl alcohols, the hexyl alcohols, octyl alcohols including capryl alcohol, decyl alcohol, lauryl alcohol, myristyl alcohol, cetyl alcohol, stearyl alcohol, beta-methoxyethyl alcohol, etc. Other suitable alcohols include the aromatic alcohols, preferably those having 1 to 20 carbon atoms, including benzyl alcohol, alpha-phenylethyl alcohol, beta-phenylethyl alcohol, o-methylbenzyl alcohol, diphenylcarbinol, triphenylcarbinol, o-ethylbenzyl alcohol, p-propylbenzyl alcohol, 2-methylolbenzyl alcohol, 3-ethylolbenzyl alcohol, 3-methylol alpha-phenylethyl alcohol, etc.

Other suitable alcohols include cycloaliphatic alcohols, preferably those having from 1 to 20 carbon atoms including cyclopentyl carbonyl dicyclohexyl-1,1'-diol, 1,2-dimethylcyclopentane-1,2 - diol, cyclopentyl alcohol, 1,2-dimethylcyclopentyl alcohol, 1-methylcyclohexyl alcohol, 3, methylcyclohexyl alcohol, 2, propylcyclopentyl alcohol, 2,2-dimethylcyclopentyl alcohol, cyclopentylethyl methylol, cyclohexylethyl methylol, etc.

Other suitable alcohols include the polyhydric alcohols, some of which have been mentioned above, preferably those containing from 1 to 20 carbon atoms, such as ethylene glycol, glycerol, diethylene glycol, pentamethylene glycol, propylene glycol, trimethylene glycol, 1,2-butanediol, 1,3-butanediol, 1,4-butanediol, hexamethylene glycol, trimethylolpropane, trimethylolethane, quercitol, inositol, 1,8-octanediol, 1,3,7-octanetriol, etc.

Formaldehyde is the principal hydrolysis degradation product of oxymethylene polymers and it is believed to be formed by the successive detachment of terminal oxymethylene units from the end of the polymer chain.

The terminal monomeric units of the polymer are often hydroxy-substituted oxymethylene (—CH$_2$OH) units and detachment of an oxymethylene group shifts the hydrogen atom of the hydroxyl group to the oxygen atom of the next to terminal oxymethylene group.

When oxyethylene units, for example, are incorporated in the chain by copolymerization, as described above, the successive detachment of oxymethylene units takes place until an oxyethylene unit becomes the terminal unit of the chain. In one embodiment of the invention, at least 95% of the polymeric chains of the treated polymer have oxyethylene units in the terminal positions. The oxyethylene, being resistant to such detachment, remains attached to the polymeric chain and protects the oxymethylene units interior thereof from further hydrolysis. Since oxyethylene units are also resistant to detachment by heat, the degraded molecule has a better initial thermal stability than the original copolymer from which it was derived.

It has been found that the products of selective reactant treatment, after substantially constant weight is achieved, are also extremely stable against attack by the reactant. Thus, an oxymethylene copolymer, after complete alkaline hydrolysis, is not only thermally stable but also extremely stable against further alkaline hydrolysis, even at concentrations and conditions more severe than those of the treatment and despite the fact that it still has a substantial content of oxymethylene units which are normally subject to degradation by alkaline hydrolysis. A hydrolyzed oxymethylene copolymer of this invention may be subjected (as a disc of 50 mil thickness) to the action of 50 wt. percent sodium hydroxide, for example, at 145° C. and lose no more than about 1% of its weight in ½ hour.

The temperature of the hydrolysis treatment is preferably elevated, as for example between about 90° and 200° C. and most preferably between about 130° and 180° C.

The alkaline material is preferably water-soluble, or soluble in the organic hydroxy-containing material and may be a strongly basic hydroxide such as the hydroxide of an alkali metal, or alkaline earth metal, or it may be the salt of a strong base and weak acid, or it may be ammonia or an organic base, such as an amine or an amidine.

Among the specific alkaline materials which may be used are sodium hydroxide, potassium hydroxide, sodium carbonate, sodium acetate, ammonium hydroxide, triethanolamine, tripropylamine, tetramethylguanidine, trimethylamine, triethylamine or tributylamine.

The amount of alkaline material used may vary widely, depending on the specific copolymer, specific alkaline material and the hydrolysis conditions.

From zero to about 10 pounds of alkaline material may be used per pound of copolymer, but preferably at least 0.001 pound of alkaline material per pound of copolymer should be present. When no alkaline material is used, it is desirable to hydrolyze in a buffered system since the products of hydrolysis are acidic and would cause the system to become acidic. Acidic degradation is not selective. Alkaline hydrolysis is preferable over neutral hydrolysis since it is more rapid and since the alkaline material neutralizes excess polymerization catalyst which would otherwise tend to degrade the polymer during the hydrolysis step. The preferred proportion of alkaline material is from about 0.001 to about 0.2 pound of alkaline material per pound of copolymer. Where ammonia is used as the alkaline material, it is preferred to use between about 0.001 and about 0.05 pound of ammonia per pound of copolymer to avoid the formation of odor-containing by-products.

The water, or other hydrolysis medium, is suitably present in amounts between about 0.001 and 100 pounds per pound of copolymer and preferably between about 5 and 10 pounds per pound of copolymer. At the higher hydrolysis temperatures, the water may be present in the reaction zone as steam. However, it is preferred to conduct the hydrolysis reaction under sufficient pressure so that the water remains in liquid phase.

The oxymethylene copolymers which are suitable for the application of this invention are the normally solid, water-insoluble copolymers containing recurring oxymethylene groups and containing oxyalkylene groups having adjacent carbon atoms. Such copolymers are conveniently prepared by copolymerizing trioxane with a cyclic ether having adjacent carbon atoms. Suitable copolymers may contain from about 0.5 to 25 higher oxyalkylene groups per 100 oxymethylene groups and most suitably from about 0.7 to 4 higher oxyalkylene groups having up to 5 carbon atoms per 100 oxymethylene groups. In the preferred copolymers the higher oxyalkylene groups are oxyethylene groups.

Among the copolymer which are utilized in accordance with this aspect of the invention are those having a structure comprising recurring units having the formula

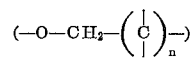

wherein $n$ is an integer from zero to 4 and wherein $n$ is zero in from 99.6 to 75 percent of the recurring units.

A preferred class of copolymers are those having a structure comprising recurring units having the formula (—O—CH$_2$—(CH$_2$)$_n$) wherein $n$ is an integer from zero to 2 and wherein $n$ is zero in from 99.6 to 75 percent of the recurring units. These copolymers are prepared by copolymerizing trioxane with a cyclic ether having the structure

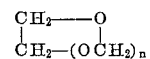

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred catalysts used in the preparation of the desired copolymers are the boron fluoride coordinate complexes with organic compounds in which oxygen or sulfur is the donor atom.

The coordinate complexes of boron fluoride may, for example, be a complex with a phenol, an ether, an ester, or a dialkyl sulfide. Boron fluoride dibutyl etherate, the coordinate complex of boron fluoride with dibutyl ether, is the preferred coordinate complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air will not prevent polymerization, but should be essentially removed for best yields.

In preparing the copolymers, the trioxane, cyclic ether and catalyst are advantageously dissolved in a common anhydrous solvent, such as cyclohexane, and permitted to react in a sealed reaction zone. The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred.

It has been found that the relatively minor amount of the cyclic ether other than trioxane used in the copolymerization reaction generally disappears completely from the reaction mixture. The required ratio of trioxane to cyclic ether in the reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and an oxyethylene group. Its incorporation into the copolymer molecule increases both the oxymethylene and the oxyethylene content of the polymer molecule.

The cyclic ether may be present in the reaction mixture in amounts between about 0.5 and 30 mol percent and preferably between about 0.7 and about 4 mol percent, based on the total mols of monomer. The optimum proportion will depend on the particular copolymer desired, the expected degree of conversion and the chemical constitution of the cyclic ether used.

The preferred copolymers produced from the preferred cyclic ethers have a structure substantially composed of oxymethylene and oxyethylene groups in a ratio from about 0.7 to 4 oxyethylene units per 100 oxymethylene units.

The copolymer may be subjected to the hydrolysis reaction immediately after completion of the polymerization reaction, or it may, if desired be subjected to washing and drying to remove unreacted monomers, solvent and catalyst residues. The copolymer may be subjected to the hydrolysis treatment as a finely divided solid material, as in a slurry, or, preferably it may be hydrolyzed in solution.

Suitable solvents include dimethyl formamide, benzyl alcohol, methanol, ethylene glycol, and anisole. A solvent which contains a hydroxyl group, such as benzyl alcohol, methanol or ethylene glycol, may also function as the hydrolysis medium, if desired. Other solvents must be admixed with water or some other hydrolysis medium. Some solvents, such as aqueous dimethyl formamide do not have any solvent action on the copolymer until temperatures of the order of 130° C. are reached. The amount of solvent will naturally depend on the nature of the solvent, the polymer and the alkaline material. Generally, amounts between about 200 and 3 cc. of solvent per gram of copolymer are suitable and preferably between about 20 and 7 cc.

The hydrolysis reaction may take from about less than 15 seconds to about 10 hours, depending on the nature of the alkaline material, the severity or hydrolysis conditions and the physical state of the copolymer. When the copolymer is dissolved, hydrolysis is much more rapid, usually between about 15 seconds and about two minutes.

In one advantageous method of operation, the polymerization product may be quenched with a quenching medium which is also suitable as a hydrolysis medium. For example, a polymerization product removed from a polymerization zone at a temperature between about 60° and about 116° C. may be quenched with from about 5 to about 50 times its weight of a water-methanol mixture containing from about 30 to about 90 wt. percent of methanol, based on the weight of the mixture. The mixture of polymerization product and quench medium is wet ground to break up the larger particles of polymer and the slurry (having from about 2 to about 20 wt. percent of solids) is suitable for hydrolysis. From about 10 to about 1000 p.p.m. of ammonia (based on the weight of solid polymer) is added and the slurry is passed through a double pipe exchanger wherein it reaches a temperature between about 150° and about 180° C. and a pressure between about 230 and about 300 p.s.i.g. Under these conditions, the polymer dissolves in the slurry medium. The residence time in the pipe exchanger is between about 30 and about 60 seconds. Water is then added in a mix T to reduce the temperature to between about 30° C. and about 95° C. to precipitate the polymer.

During the hydrolysis reaction a portion of the copolymer is decomposed to monomeric form resulting in a weight loss of copolymer. The hydrolysis reaction is complete when the weight loss substantially ceases. Typically, between about 5 and 40 weight percent of polymer may be lost before the weight loss drops to between about 0.1% and 5% of the original rate of weight loss, indicating substantial completion of the hydrolysis process. When hydrolysis is complete, at least about 95% of the polymer molecules have both ends terminated by higher oxyalkylene units. The weight loss during hydrolysis is dependent on the particular copolymer treated and particularly on the number of higher oxyalkylene groups per 100 oxymethylene groups in the copolymer.

After completion of the hydrolysis reaction, the copolymer may be precipitated from solution, if necessary, as by cooling as described above, or by adding a large amount of a non-solvent, and then be washed with water and dried.

It is generally desirable to incorporate one or more thermal stabilizers into the copolymer in order to bring its thermal degradation level even lower.

The proportion of stabilizer incorporated depends upon the specific stabilizer used. A proportion between about 0.05 and 10 weight percent (based on the weight of polymer) has been found to be suitable for most stabilizers.

One suitable stabilizer system is a combination of an anti-oxidant ingredient, such as phenolic anti-oxidant and most suitably a substituted bisphenol, and an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiarybutyl phenol) and 4,4'butylidene bis-(6-tertiarybutyl-4-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, substituted polyacrylamides, polyurethanes, polyvinyl pyrrolidone, hydrazides, compounds having 1 to 6 amide groups, proteins, compounds having tertiary amine and terminal amide groups, compounds having amidine groups, cycloaliphatic amine compounds and aliphatic acylureas. Suitable scission inhibitors as well as suitable anti-oxidants and proportions are disclosed in application Serial No. 826,115, filed by Dolce on July 10, 1959; U.S. Patent No. 3,144,431 by Dolce, Berardinelli and Hudgin; application Serial No. 258,126, filed by Berardinelli on February 13, 1963; application Serial No. 838,832, filed by Dolce and Hudgin on September 9, 1959; application Serial No. 262,348, filed by Kray and Dolce on March 4, 1963; application Serial No. 256,146, filed by Berardinelli, Kray and Dolce on February 4, 1963; U.S. Patent No. 3,133,896, by Dolce and Berardinelli, U.S. Patent No. 3,156,669 by Kray and Dolce. The disclosures of the above mentioned applications are incorporated herein by reference.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, in finely divided dry state may be blended into finely divided polymer in any suitable blending apparatus.

One suitable method of incorporation of the chemical stabilizers is by blending a dry solid stabilizer into the plastic polymer, while the latter is being kneaded as on heated rolls or through an extruder.

In addition the stabilization of oxymethylene copolymers, as described in detail above, the general method of this invention is applicable to any polymer having stable and unstable portions in its molecules and preferably to any heterogeneous copolymer susceptible to thermal degradation and containing monomeric units of high susceptibility to thermal degradation to the monomer interspersed with monomeric units which are stable to thermal degradation.

EXAMPLE I

Five hundred parts by weight of an oxymethylene copolymer having 3.1 wt. percent of monomeric units derived from dioxolane, 1000 parts of water and 150 parts of triethanolamine was heated at 140–150° C. for 2¼ hours in a sealed pressurized vessel. At the end of this period the vessel was cooled to room temperature and opened. The copolymer was washed successively with acetone and hot water and then dried.

EXAMPLE II

The hydrolyzed copolymer of Example I and the original copolymer of Example I were each milled with 0.1% by weight of cyanoguanidine and 0.5% by weight of 2,2'-methylene bis-(4-methyl-6-tertiarybutyl phenol). The milling operation was carried out in a heated chamber with sigma blade mixers over a period of 45 minutes and the temperature during milling was 200–202° C. The amount of material lost during milling and the degradation rates of both original and hydrolyzed polymer, both before and after incorporation of the stabilizers is shown in Table I, below. The thermal degradation rate was determined in an open vessel in a circulating air oven and reported as wt. percent loss/minute.

Table I

| Polymer | Degradation Rate Without Stabilizers | Wt. percent/min. with Stabilizers | Wt. loss during milling, percent |
| --- | --- | --- | --- |
| Example I (original) | 0.88 | 0.018 | 5 |
| Example (hydrolyzed) | 0.50 | 0.015 | 0.2 |

EXAMPLE III

A mixture of 100 grams of trioxane-dioxolane copolymer (having an oxyethylene content equivalent to 3.9 wt. percent of dioxolane), 1000 cc. of water and 67 cc. of ammonium hydroxide (28% $NH_3$) was heated 17½ hours at 95–98° C. in a glass flask under reflux. At the end of this period the reaction mixture was cooled. The copolymer was separated by filtration and the polymer was washed to neutral with water and dried. The weight loss was 9% based on the weight of original copolymer.

The original copolymer and the hydrolyzed copolymer were each milled for 45 minutes as above with 0.1 wt. percent of nitrilotripropionamide and 0.5 wt. percent of 2,2'-methylene bis-(5-methyl-6-tertiary butyl phenol). The amount of material lost during milling and the degradation rates of both original and hydrolyzed polymer, after incorporation of the stabilizers is shown in Table II, below:

Table II

| Polymer | Degradation rate, wt. percent/min. | Wt. loss during milling, percent |
| --- | --- | --- |
| Original | 0.06 | 16.4 |
| Hydrolyzed | 0.02 | 7.4 |

EXAMPLE IV

A mixture of 120 grams of trioxane-dioxolane polymer (having an oxyethylene content equivalent to 3.1 wt. percent of dioxolane), 600 cc. of water, 600 cc. of dimethylformamide and 37 grams of tripropylamine was heated to 148–152° C. in a pressure vessel for 21 minutes. The copolymer was in solution. After cooling to precipitate the copolymer, the precipitated material was separated by filtration, washed with acetone and dried. The weight loss was 8.4% of the original copolymer.

The original copolymer and hydrolyzed copolymer were milled with the stabilizers and by the procedures of Example II. The results after stabilization are shown in Table III.

Table III

| Polymer | Degradation rate, wt. percent/min. | Wt. loss during milling, percent |
| --- | --- | --- |
| Original | 0.016 | 6 |
| Hydrolyzed | 0.010 | 2 |

When the hydrolyzed copolymer was milled with the stabilizers for only seven minutes, the weight loss was 1.7% and the thermal stability was 0.009 wt. percent/min.

EXAMPLE V

A mixture of 120 grams of the copolymer of Example IV, 600 cc. of dimethylformamide, 590 cc. of water and 20 grams of concentrated (28% $NH_3$) $NH_4OH$ was heated to 148–152° C. for 10 minutes in a pressure vessel. The copolymer was in solution. After cooling to precipitate the copolymer, washing with water and drying, 10.3 wt. percent of the original copolymer was lost.

When the copolymer was milled for seven minutes, as in Example IV, it lost 1.8% of its weight and its degradation rate was 0.007 wt. percent/min.

EXAMPLE VI

A mixture of 100 grams of the copolymer of Example IV, 1000 cc. of methanol and 20 grams of tetramethylguanidine was heated to 158-165° C. for 15 minutes in a pressure vessel. After the copolymer was cooled and precipitated, washed with water and dried, its weight loss was 12.1% of the original copolymer. When the copolymer was milled for seven minutes, as in Example IV, it lost 1.4% of its weight and its degradation rate was 0.009 wt. percent/minute.

EXAMPLE VII

A mixture of 100 parts by weight of trioxane, 2.4 parts of ethylene oxide, 1.1 parts of cyclohexane, 340 p.p.m. of methylal and 70 p.p.m. of boron trifluoride (as the dibutyl etherate complex) were fed to one end of a continuous mixer having an interrupted thread screw placed in a cylindrical barrel. The mixer barrel had rows of teeth on its inner surface and the screw was both rotated and reciprocated in such a manner that the teeth on the barrel passed through the interruptions in the thread of the screw. The reaction mass advanced in a generally helical path with alternate advance and retraction as it progressed to the discharge point.

The temperature in the mixer rose to a maximum of 105° to 115° C. at the discharge point. Residence time in the mixer was about 1 minute.

The discharged product was mixed in a wet grinder with 1250 parts of a solution of 59.9 wt. percent of methanol, 40 wt. percent of water and 0.1 wt. percent of ammonia and ground to produce a slurry of 8% solids content. The slurry was passed into a double-pipe exchanger wherein it was heated to 320° F. and 240 p.s.i.g. The polymer dissolved. After 45 seconds in the exchanger, water was added in a mixing T to reduce the temperature and precipitate the polymer.

EXAMPLE VIII

A sample of a copolymer prepared in the manner of Example VII was dried and 130 parts by weight of this copolymer was mixed with 867 parts by weight of a solution containing 59.9 weight percent isopropyl alcohol, 40.0 weight percent water and 0.1 weight percent ammonia. This mixture was heated rapidly to 160° C. at a pressure of 150 p.s.i.g. in a 3 liter rocking autoclave. As soon as the temperature reached 160° C. the autoclave was immersed in a water bath to reduce the water rapidly and precipitate the polymer. The polymer precipitated as a uniform granular mass.

It is to be understood that the foregoing detailed description is given merely by way of illustration and that many variations may be made therein without departing from the spirit of my invention.

The embodiments of the invention in which an exclusive property or privilege is claimed are defined as follows:

1. A process for the stabilization of a normally solid oxymethylene polymer having a melting point of at least 150° C., said polymer having at least one chain containing
   (1) between about 85 and about 99.9 mol percent oxymethylene units interspersed with
   (2) between about 0.1 and about 15 mol percent of —O—R— units wherein R is a divalent radical containing at least two carbon atoms directly linked to each other and positioned in the chain between the two valences, with any substituent in said R radical being inert,
   at least part of the terminal units of the molecules of said polymer being comparatively thermally unstable hydroxy-substituted oxymethylene units of higher susceptibility to thermal degradation than terminal units derived from said —O—R— units,
   said process comprising
   reacting said comparatively unstable terminal units of said polymer, at a pH of at least 7, with between about 0.001 and 100 lbs. (per lb. of polymer) of a chemical reactant comprising a hydroxy-containing material selected from the group consisting of water and an alcohol,
   said reaction being for a selected time between about 15 seconds and about 10 hours, said time being selected such that the reaction, after exposure to sufficiently high temperature conditions selected from between about 90° C. and about 200° C., has selectively removed said comparatively thermally unstable terminal units until the initial weight loss rate of the treated polymer is below 0.1 weight percent per minute measured by heating the polymer at a temperature of 222° C. in an open vessel in a circulating air oven.

2. The process of claim 1 wherein said alcohol is methanol.

3. The process of claim 1 wherein said initial weight loss rate of the treated polymer is determined when said polymer is mixed with 0.1% by weight of cyanoguanidine and 0.5% by weight of 2,2'-methylene-bis-(4-methyl-6-tertiary butyl phenol).

4. The process of claim 3 wherein said polymer, in untreated form, has an initial weight loss rate of above 0.1 weight percent per minute when mixed with 0.1% by weight of cyanoguanidine and 0.5% by weight of 2,2'-methylene-bis-(4-methyl-6-tertiary butyl phenol).

5. A process for the stabilization of a normally solid oxymethylene polymer having a melting point of at least 150° C., said polymer having at least one chain containing
   (1) between about 85 and 99.9 mol percent oxymethylene units interspersed with
   (2) between about 0.1 and about 15 mol percent of —O—R— units wherein R is a divalent radical containing at least two carbon atoms directly linked to each other and positioned in the chain between the two valences with any substituent in said R radical being inert,
   at least part of the terminal units of the molecules of said polymer being comparatively thermally unstable hydroxy-substituted oxymethylene units of higher susceptibility to thermal degradation than terminal units derived from said —O—R— units,
   said process comprising
   reacting said comparatively unstable terminal units of said polymer, at a pH of at least 7, with between about 0.001 and 100 lbs. (per lb. of polymer) of a chemical hydroxy-containing reactant selected from the group consisting of water and an alcohol,
   said reaction being for a selected time between about 15 seconds and about 10 hours, said time being selected such that the reaction, after exposure to sufficiently high temperature conditions above about 130° C., has selectively removed said comparatively thermally unstable units until at least 95% of said polymer molecules which were terminated by said comparatively thermally unstable terminal units, are terminated by comparatively stable units having carbon-to-carbon bonds derived from said —O—R— units.

6. A process for the stabilization of a normally solid oxymethylene polymer having a melting point of at least 150° C., said polymer having at least one chain containing
   (1) between about 85 and about 99.9 mol percent oxymethylene units interspersed with
   (2) between about 0.1 and about 15 mol percent of —O—R— units wherein R is a divalent radical containing at least two carbon atoms directly linked to each other and positioned in the chain between the two valences, with any substituent in said R radical being inert, at least part of the terminal units of the molecules of said polymer being comparatively thermally unstable hydroxy-substituted oxymethylene units of higher susceptibility to thermal degradation than terminal units derived from said —O—R— units, said polymer, in untreated form, having a first initial rate of weight loss, said process comprising reacting said comparatively unstable terminal units of said polymer, at a pH of at least 7, with between about 0.001 and 100 lbs. (per lb. of polymer) of a chemical hydroxy-containing reactant selected from the group consisting of water and an alcohol, said reaction being for a selected time between about 15 seconds and about 10 hours, said time being selected such that the reaction, after exposure to sufficiently high temperature conditions selected from between about 90° C. and about 200° C., has selectively removed said comparatively thermally unstable terminal units until said weight loss substantially ceases, said weight loss rates being stated in terms of weight lost per minute when said polymer is maintained in an open vessel in a circulating air oven at 222° C.

7. A process for the stabilization of a normally solid oxymethylene polymer having a melting point of at least 150° C., said polymer having at least one chain containing (1) between about 85 and about 99.9 mol percent oxymethylene units interspersed with (2) between about 0.1 and about 15 mol percent of —O—R— units wherein R is a divalent radical containing at least two carbon atoms directly linked to each other and positioned in the chain between the two valences, with any substituent in said R radical being inert, at least part of the terminal units of the molecules of said polymer being comparatively thermally unstable hydroxy-substituted oxymethylene units of higher susceptibility to thermal degradation than terminal units derived from said —O—R— units, reacting said comparatively unstable terminal units of said polymer, at a pH of at least 7, with between about 0.001 and 100 lbs. (per lb. of polymer) of a chemical hydroxy-containing reactant selected from the group consisting of water, and an alcohol, said reaction being for a selected time between about 15 seconds and about 10 hours, said time being selected such that the reaction, after exposure to sufficiently high temperature conditions selected from between about 90° C. and about 200° C., has selectively removed said comparatively thermally unstable terminal units until a disc of said polymer, having a thickness of 50 mils, will lose no more than about 1% of its weight in ½ hour when subjected to 50 weight percent of sodium hydroxide at 145° C.

8. The process of claim 7 when said polymer is mixed with 0.1% by weight of cyanoguanidine and 0.5% by weight of 2,2'-methylene-bis-(4-methyl-6-tertiary butyl phenol) before being formed into said disc.

9. A process for the stabilization of a normally solid oxymethylene polymer having a melting point of at least 150° C., said polymer having at least one chain containing (1) between about 85 and 99.9 mol percent oxymethylene units interspersed with (2) between about 0.1 and about 15 mol percent of —O—R— units wherein R is a divalent radical containing at least two carbon atoms directly linked to each other and positioned in the chain between the two valences, with any substituent in said R radical being inert, at least part of the terminal units of the molecules of said polymer being comparatively thermally unstable hydroxy-substituted oxymethylene units of higher susceptibility to thermal degradation than terminal units derived from said —O—R— units, said process comprising reacting said comparatively unstable terminal units of said polymer, in solution at a pH of at least 7, with between about 0.001 and 100 lbs. (per lb. of polymer of a chemical hydroxy-containing reactant selected from the group consisting of water and an alcohol, said reaction being for a selected time between about 15 seconds and about 2 minutes, said time being selected such that the reaction, after exposure to sufficiently high temperature conditions above about 130° C., has selectively removed said comparatively thermally unstable terminal units until the initial weight loss rate of the treated polymer is below 0.1 weight percent per minute measured by heating the polymer at a temperature of 222° C. in an open vessel in a circulating air oven.

10. A process for the stabilization of a normally solid oxymethylene polymer having a melting point of at least 150° C., said polymer having at least one chain containing (1) between about 85 and about 99.9 mol percent oxymethylene units interspersed with (2) between about 0.1 and about 15 mol percent of —O—R— units wherein R is a divalent radical containing at least two carbon atoms directly linked to each other and positioned in the chain between the two valences with any substituent in said R radical being inert, at least part of the terminal unit of the molecule of said polymer having comparatively thermally unstable hydroxy-substituted oxymethylene terminal units of higher susceptibility to thermal degradation than terminal units derived from said —O—R— units, said polymer, in untreated form, having a first initial weight loss rate, said process comprising reacting said comparatively unstable terminal units of said polymer, at a pH of at least 7, with between about 0.001 and 100 lbs. (per lb. of polymer) of a chemical hydroxy-containing reactant selected from the group consisting of water and an alcohol, said reaction being for a selected time between about 15 seconds and about 10 hours, said time being selected such that the reaction, after exposure to sufficiently high temperature conditions selected from between about 90° C. and about 200° C., has selectively removed said comparatively thermally unstable terminal units until one of the following occurs:

(1) the weight loss rate of the treated polymer is below 0.1 weight percent per minute (2) at least 95% of said polymer molecules which were terminated by said comparatively thermally unstable terminal units, are terminated by comparatively stable units having carbon-to-carbon bonds derived from said —O—R— units, (3) a disc of said polymer having a thickness of 50 mils will lose no more than about 1% of its weight in a half hour when subjected to 50 weight percent sodium hydroxide at 145° C. and (4) the weight loss rate drops to between about 0.1 and about 5% of said first initial weight loss rate said weight loss rates being stated in terms of weight lost per minute when said polymer is maintained in an open vessel in a circulating air oven at 222° C.

11. A normally solid moldable heterogeneous oxymethylene copolymer having a melting point of at least 150° C. and having polymeric chains made up of between about 85 and about 99.9 mol percent of self-connected repeating oxymethylene units and containing —O—R— units, wherein R is a divalent radical containing at least two carbon atoms directly linked to each other and positioned in the chain between the two valences with any substituents in said R radical being inert, at least 95% of the polymer chains which were formerly terminated by comparatively unstable hydroxy-substituted oxymethylene units being terminated by comparatively stable units derived from said —O—R— units, said polymer having a weight loss rate (as a disc of 50 mil thickness) of no more than about 1 weight percent in ½ hour when subjected to 50 weight percent sodium hydroxide at 145° C.

12. A normally solid moldable heterogeneous oxymethylene copolymer having a melting point of at least 150° C. and having polymeric chains made up of between about 85 and about 99.9 mol percent of self-connected repeating oxymethylene units and containing between about 0.1 and about 15 mol percent interspersed oxyethylene units, at least 95% of the polymer chains which were formerly terminated by comparatively unstable hydroxy-substituted oxymethylene units being terminated by comparatively stable hydroxy-substituted oxymethylene units, said polymer having a weight loss rate (as a disc of 50 mil thickness) of no more than about 1 weight percent in ½ hour when subjected to 50 weight percent sodium hydroxide at 145° C.

References Cited by the Examiner

UNITED STATES PATENTS 3,116,267  12/1962  Dolce _____ 260—45.9

LEON J. BERCOVITZ, *Primary Examiner.*

UNITED STATES PATENT OFFICE
CERTIFICATE OF CORRECTION

Patent No. 3,219,623                 November 23, 1965

Frank M. Berardinelli

It is hereby certified that error appears in the above numbered patent requiring correction and that the said Letters Patent should read as corrected below.

Column 13, lines 14 to 17, strike out "said polymer is maintained in an open connected repeating oxymethylene units and containing tween about 85 and about 99.9 mol percent of self- -O-R- units," and insert instead -- tween about 85 and about 99.9 mol percent of self-connected repeating oxymethylene units and containing between about 0.1 and about 15 mol percent interspersed -O-R- units, --; column 14, lines 14 and 15, for "oxymethylene" read -- oxyethylene --.

Signed and sealed this 13th day of December 1966.

(SEAL)
Attest:

ERNEST W. SWIDER                  EDWARD J. BRENNER
Attesting Officer               Commissioner of Patents UNITED STATES PATENT AND TRADEMARK OFFICE
Certificate Patent No. 3,219,623          Patented November 23, 1965

Frank M. Berardinelli

Application having been made by Frank M. Berardinelli, the inventor named in the patent above identified, for the issuance of a certificate under the provisions of Title 35, Section 256, of the United States Code, adding the name of Thomas J. Dolce as a joint inventor, and a showing and proof of facts satisfying the requirement of the said section having been submitted, it is this 10th day of October 1978, certified that the name of the said Thomas J. Dolce is hereby added to the said patent as a joint inventor with the said Frank M. Berardinelli.

FRED W. SHERLING,
*Associate Solicitor.*

Disclaimer 3,219,623.—*Frank M. Berardinelli*, Millington, N.J. and *Thomas J. Dolce*, Stirling, N.J. STABILIZATION OF OXYMETHYLENE CO-POLYMERS WITH AN HYDROXY CONTAINING REACTANT. Patent dated Nov. 23, 1965. Disclaimer filed Jan. 25, 1978, by the assignee, *Celanese Corporation*.

Hereby enters this disclaimer to claims 1 through 10 inclusive of said patent.

[*Official Gazette, April 15, 1980.*]